United States Patent [19]

Scheffler et al.

[11] Patent Number: 4,846,211
[45] Date of Patent: Jul. 11, 1989

[54] INLET VALVE IN A TWO-TOWER AIR DRIER

[75] Inventors: Manfried A. G. Scheffler, Bara; Lars S. J. Karlsson, Billeberga; Anders M. Larsson, Helsingborg, all of Sweden

[73] Assignee: Garphyttan Haldex AB, Landskrona, Sweden

[21] Appl. No.: 190,835

[22] Filed: May 6, 1988

[30] Foreign Application Priority Data

May 7, 1987 [SE] Sweden .................. 87018834

[51] Int. Cl.⁴ .................. F16K 11/00; B01D 53/04
[52] U.S. Cl. .................. 137/119; 55/163; 55/179; 55/387
[58] Field of Search .............. 55/31, 33, 161–163, 55/179, 387, DIG. 17; 137/118, 119, 861, 862, 871, 877

[56] References Cited

U.S. PATENT DOCUMENTS

| | | |
|---|---|---|
| 1,486,617 | 3/1924 | Teegardin .................. 137/118 X |
| 1,588,657 | 6/1926 | Christensen .................. 137/118 X |
| 1,609,641 | 12/1926 | Christensen .................. 137/118 |
| 1,967,383 | 7/1934 | Turgot .................. 137/118 X |
| 2,386,585 | 10/1945 | Blank .................. 137/118 |
| 3,324,631 | 6/1967 | Kreuter .................. 55/179 X |
| 3,481,358 | 12/1969 | Gardner, Sr. .................. 137/118 |
| 3,543,783 | 12/1970 | Ifield .................. 137/118 X |
| 3,778,967 | 12/1973 | Kauer, Jr. et al. .................. 55/163 X |
| 4,265,269 | 5/1981 | Dolberg et al. .................. 137/118 |
| 4,331,457 | 5/1982 | Mörner .................. 55/179 X |
| 4,398,929 | 8/1983 | Segersten .................. 55/163 |
| 4,512,781 | 4/1985 | Caralli et al. .................. 55/163 X |
| 4,525,183 | 6/1985 | Cordes et al. .................. 55/179 |
| 4,781,209 | 11/1988 | Nelander et al. .................. 137/119 |

FOREIGN PATENT DOCUMENTS

| | | | |
|---|---|---|---|
| 3533893 | 3/1987 | Fed. Rep. of Germany | 55/179 |
| 1235456 | 6/1971 | United Kingdom | 137/119 |

*Primary Examiner*—Robert Spitzer
*Attorney, Agent, or Firm*—Laurence R. Brown; Alfred J. Mangels

[57] ABSTRACT

An inlet valve for a two-tower air drier for directing an air flow from a central inlet to either tower through a respective one of a pair of opposed outlets. A valve body is axially movable between two valve seats and is provided with two annular flanges at such an axial distance from each other that at no position of the valve body will a flange cover any part of the central inlet. A restricted flow area past the flanges is accomplished as a flange moves towards its respective valve seat. The valve body is biased towards a neutral position by a helical compression spring, which is attached to the housing of the valve with its two ends and passes through an aperture in a stem of the valve body between the two flanges.

4 Claims, 1 Drawing Sheet

INLET VALVE IN A TWO-TOWER AIR DRIER

FIELD OF THE INVENTION

This invention relates to a valve in a two-tower air drier for directing an air flow entering through a central inlet to either one of two drying towers through a respective outlet, a valve body being axially movable to sealing engagement with a valve seat at the respective outlet while at the same time leaving the other outlet open.

BACKGROUND OF THE INVENTION

The purpose of an air drier, which preferably but not exclusively can be used on vehicles, is to remove moisture from the air delivered by the compressor before it reaches different air consuming devices. In an air drier of the two-tower type one tower is used to dry the air by a desiccant therein, while at the same time the other tower is regenerated by a small fraction of the dry air passed through the desiccant therein and to the atmosphere.

The valve mentioned above, which can be defined as an inlet valve and is of flip-flop type, directs the air to either one of the two drying towers and is governed by the pressure difference between its two outlets and also by the air flow itself. The pressure difference in turn is accomplished by other means in the air drier. A return force for the valve body to a neutral position is provided by spring means.

THE INVENTION

The main object of the invention is to eliminate certain functional problems with a prior art valve having an annular flange in the air flow and subjected to the above-mentioned pressure differential.

A fail-safe function is accomplished with a valve according to the invention, which is characterized in that the valve body is provided with two annular flanges at such an axial distance from each other that at no position of the valve body will a flange cover any part of the inlet.

The functional advantage of the two flanges is further enhanced if the interior of the valve is provided with an annular step towards each valve seat, so that a restriction of the flow area past the flange is accomplished.

An elegant and simple solution to the problem of obtaining the spring bias for the valve body towards a neutral position is according to the invention attained in that a helical compression spring is attached to the housing of the valve with its two ends and passes through an aperture in a part of the valve body between the two flanges.

BRIEF DESCRIPTION OF THE DRAWINGS

The invention will be described in further detail below reference being made to the accompanying drawing, in which.

DETAILED DESCRIPTION OF A PREFERRED EMBODIMENT

Figure 1:
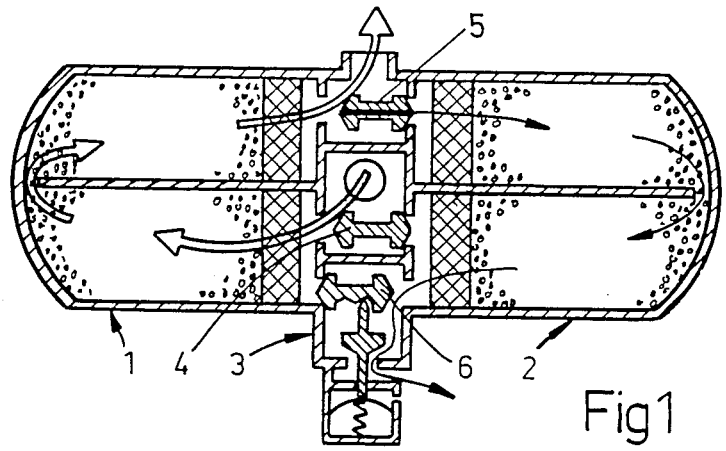
FIG. 1 is a schematic sectional view through a two-tower air drier.

In FIG. 1 a conventional air drier of the two-tower type is depicted. The main purpose of an air drier is to remove moisture from compressed air to be consumed for example on vehicles. The air drier is normally arranged in the system between a compressor and an air tank. In an air drier of the two-tower type, one tower containing desiccant is used for drying the air passing through from the compressor to the air tank, whereas the other one at the same time is being regenerated by a small fraction of the dry air passed back through the desiccant therein and out to the atmosphere.

As stated above the air drier is conventional; accordingly only a brief description thereof will be given so as to explain the surrounding for the valve according to the invention. For a more thorough description reference is for example made to U.S. Pat. No. 4,398,929.

The air drier consists primarily of a left tower 1 containing desiccant or moisture adsorbing material, a similar right tower 2, and a central part 3 with the different valves for the proper function of the drier.

As indicated by the thicker arrows in FIG. 1, air from the compressor enters the left tower 1 through an inlet valve 4, closing off the right tower 2. After having passed through the desiccant in the left tower 1, the dry air leaves the air drier (for further flow to the air tank in the system) via an outlet valve 5. By the fact that the valve body of this outlet 5 is provided with a minor bore, a small fraction of the dry air enters the right tower 2 for regenerating the desiccant therein as indicated by single-line arrows. The regenerating air leaves the air drier to the atmosphere via a switch-over valve 6.

When the desired air pressure in the air tank has been reached and no more air is fed to the air drier, the outlet to the atmosphere in the bottom part thereof is closed by a pneumatic signal. Concurrently therewith the valve body of the switch-over valve 6 is left free and moves over to its opposite position due to the pressure differential between the two drying towers 1 and 2. This leads to a pressure equalization.

When again more compressed air is needed the above mentioned pneumatic signal disappears, so that the bottom valve opens and the valve body of the switch-over valve 6 is locked in its new position. Due to the occurring pressure drop the two valves 4 and 5 move over to their opposite positions, so that the main air flow from the compressor is directed through the right tower 2, whereas the small regenerating flow is directed through the left tower 1 and out to the atmosphere.

Figure 2:
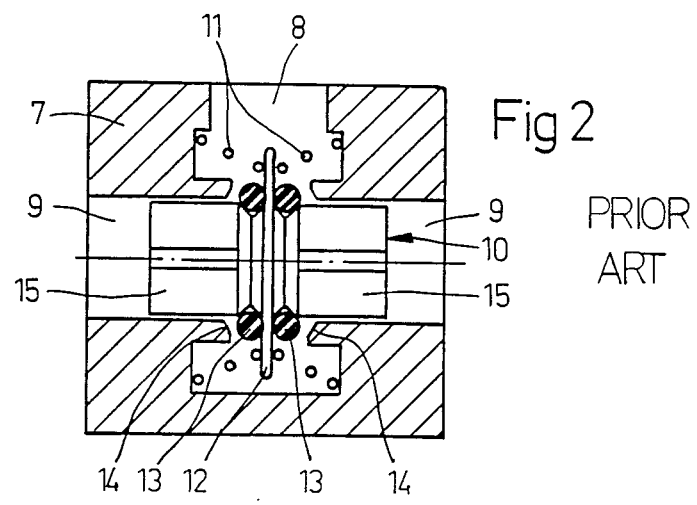
FIG. 2 is a section through a prior art inlet valve for an air drier according to FIG. 1.

FIG. 2 shows a prior art inlet valve 4. A valve housing 7 is provided with an inlet 8 (from the compressor in the system) and two outlets 9 (to the respective drying towers 1 and 2). A valve body 10 is axially movable in the through bore defined by the two outlets 9 and is biased towards a neutral position by two compression springs 11. The valve body 10 is provided on one hand with a central annular flange 12 surrounded by two O-rings 13 for sealing engagement with annular valve seats 14 in the valve housing 7 and on the other hand with two guiding cylinders 15 having axial recesses for allowing air to pass.

Experience has shown that under extreme circumstances the intended function as described above may be difficult to obtain with this design. It is important to guarantee that the inlet valve always chooses the right position, so that the proper switch-over between the two drying towers occurs.

Figure 3:
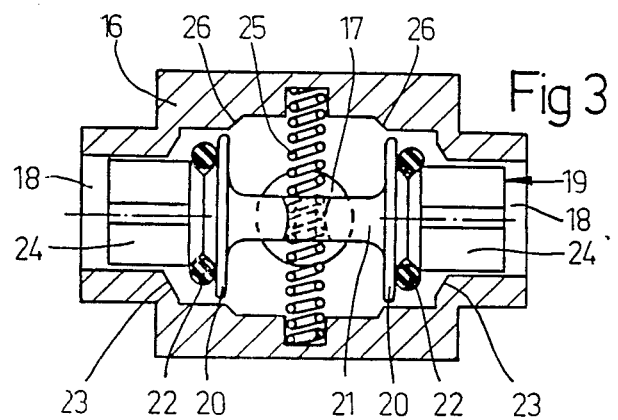
FIG. 3 is a section through a similar valve according to the invention.

A new and improved design according to the invention of the inlet valve 4 is shown in FIG. 3.

A valve housing 16 is provided with a central inlet 17 (from the compressor) and two outlets 18 (to the respective drying towers 1 and 2). A valve body 19 is axially movable in the through bore defined by the two outlets 18. The valve body 19 is provided with two annular flanges 20 and therebetween a stem 21. At the opposite side of each flange 20 is an O-ring 22 for sealing engagement with a respective annular valve seat 23 in the valve housing 16. Axially outside the O-rings 22 the valve body 19 is also provided with two guiding cylinders 24 having axial recesses for allowing air to pass. A helical compression spring 25 is attached with its two ends to the valve housing 16 and passes through a central aperture in the stem 21. The single spring 25 will thereby provide the valve body 19 with a force biasing it towards a neutral position as shown in FIG. 3 (and replaces the two springs needed in prior art designs).

The distance between the two flanges 20 is such in comparison with the size of the inlet opening 17 that irrespective of the position of the valve body 19 no flange can cover any part of the inlet opening. This means in other words that the air flow from the inlet opening 17 always enters between the two flanges 20 and can never hit a flange from the side to cause position problems.

It is to be noted that the interior of the valve housing 16 is provided with a step 26 from a portion with substantially larger cross-sectional area than that of the flange 20 towards a portion with only slightly larger diameter than that of the flange, when the latter is moving towards its respective valve seat 23.

If for example the drying tower to the right of the inlet valve is open to the atmosphere, whereas the pressure in the drying tower to the left of the valve is rising, the valve body 19 is subjected to a force to the right (provided that the air flow is above a minimum level), so that the right hand O-ring 22 sealingly engages its seat 23. This force is enhanced by the fact that the flow area past the right hand flange 20 is smaller than that past the left hand flange.

Modifications are possible within the scope of the appended claims.

We claim:

1. A valve for a two-toner air drier for directing an air flow to either one of two drying towers through a respective outlet, said valve comprising: a housing having a pair of opposed, spaced outlets and an inlet positioned between the outlets, each outlet having an associated valve seat; and a valve body axially movable within the housing between the outlets for sealing engagement with the valve seat at the respective outlet while at the same time leaving the other outlet open, the valve body including two spaced annular flanges at such a distance from each other that at no position of the valve body will a flange cover any part of the inlet; wherein the housing includes a pair of spaced, annular steps each positioned between the inlet and a respective valve seat to provide a flow area restriction between the housing and the flange as a respective flange is moved toward its associated valve seat.

2. A valve according to claim 1, wherein the valve body is biased towards a neutral position by means of a helical compression spring, which is attached to the housing at its two ends and which passes through an aperture in the valve body, the valve body aperture positioned between the two flanges.

3. A two-way valve for directing fluid flow from an inlet to one of a pair of spaced outlets, said valve comprising:
    (a) a hollow housing having a pair of opposed flow outlets and a flow inlet positioned between the opposed outlets, the housing including an interiorly positioned valve seat adjacent to each outlet;
    (b) valve body means movable within the housing and between the opposed outlets to engage a respective one of the valve seats and prevent flow through the corresponding outlet while the opposite outlet is open to permit flow therethrough, the valve body means including a pair of spaced sealing means carried by a stem member, each sealing means adapted to engage with and to seal off a respective outlet, the spacing between the sealing means being sufficient to prevent the sealing means from covering the flow inlet as the valve body moves from a first position at which only one flow outlet is blocked by the sealing means to a second position at which only the opposite flow outlet is blocked by the sealing means; and
    (c) spring means carried within the housing and passing through the stem member for resiliently maintaining the stem member in an intermediate position at which the sealing means carried by the stem member are spaced from their respective flow outlets.

4. A valve in accordance with claim 3, wherein the spring means includes a helical compression spring having spaced ends each supported by the housing, the spring having an intermediate portion passing through an aperture in the stem member, the aperture positioned between the respective sealing means carried by the stem member.

* * * * *